G. DELAGE.
APPARATUS FOR CONSTRUCTING SECTIONAL MOLDS.
APPLICATION FILED JUNE 11, 1918.
1,361,835.
Patented Dec. 14, 1920.
3 SHEETS—SHEET 1.
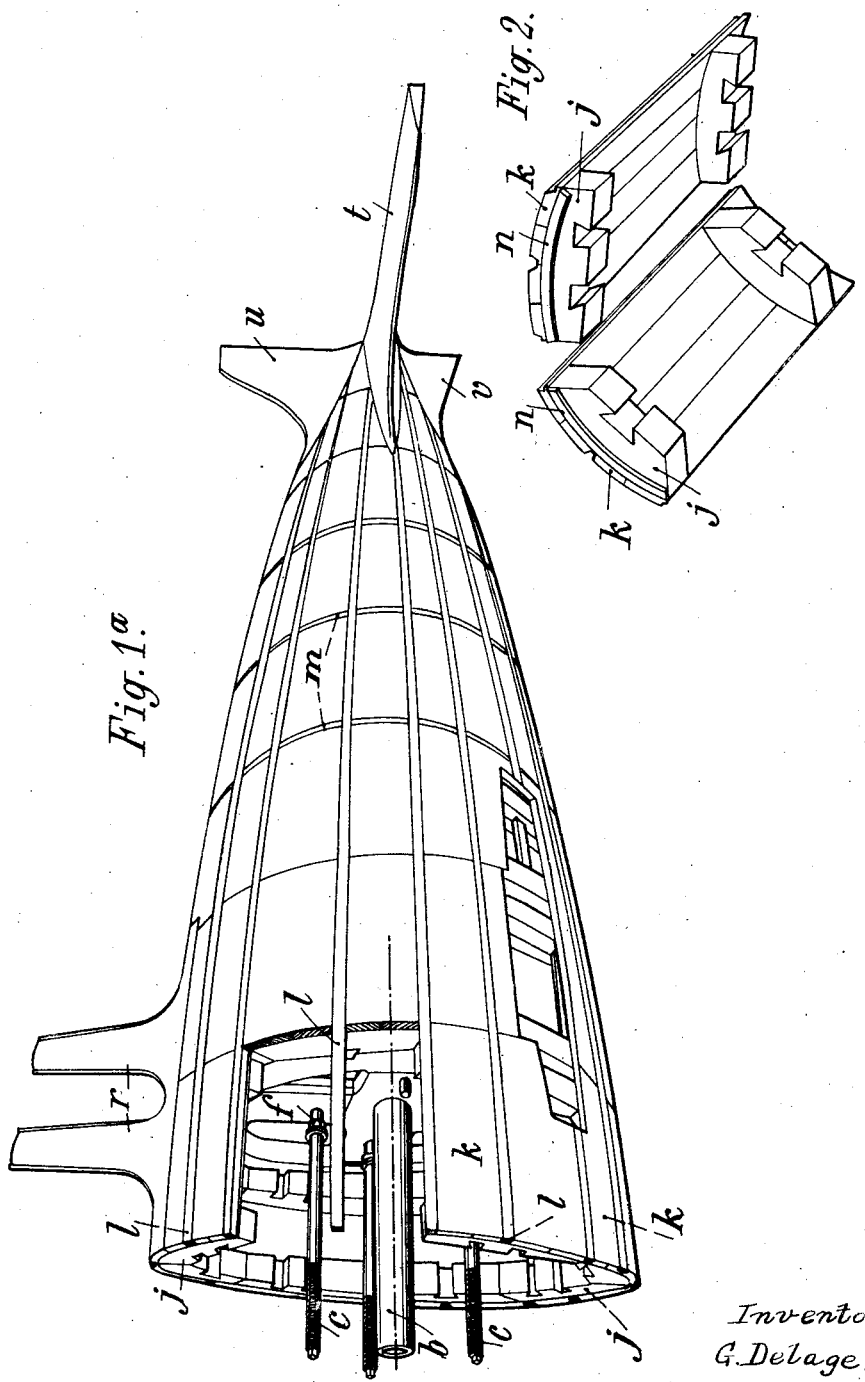
Inventor
G. Delage.
By H. R. Kerslake
Atty G. DELAGE.
APPARATUS FOR CONSTRUCTING SECTIONAL MOLDS.
APPLICATION FILED JUNE 11, 1918.
1,361,835.
Patented Dec. 14, 1920.
3 SHEETS—SHEET 2.
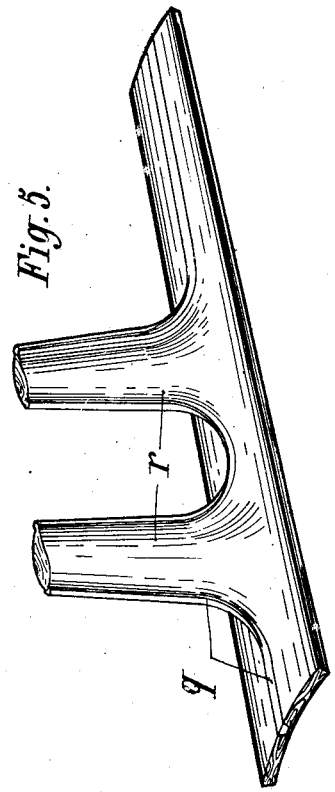
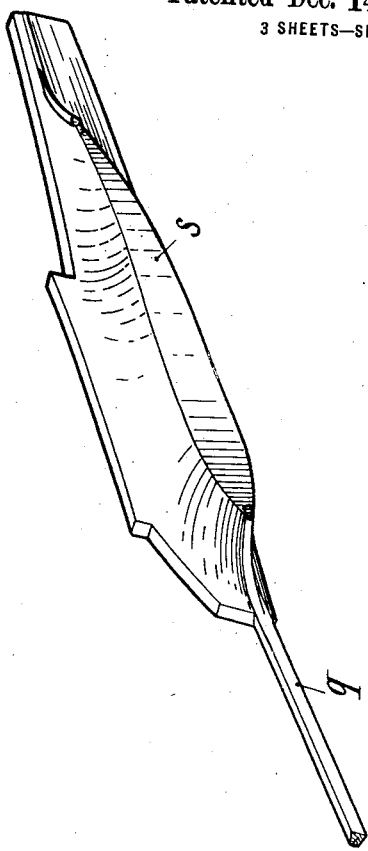
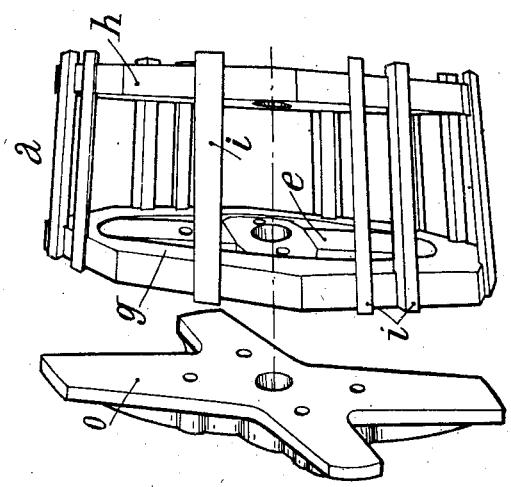
Inventor
G. Delage.
By H. R. Kerslake
Atty.

G. DELAGE.
APPARATUS FOR CONSTRUCTING SECTIONAL MOLDS.
APPLICATION FILED JUNE 11, 1918.
1,361,835.
Patented Dec. 14, 1920.
3 SHEETS—SHEET 3.
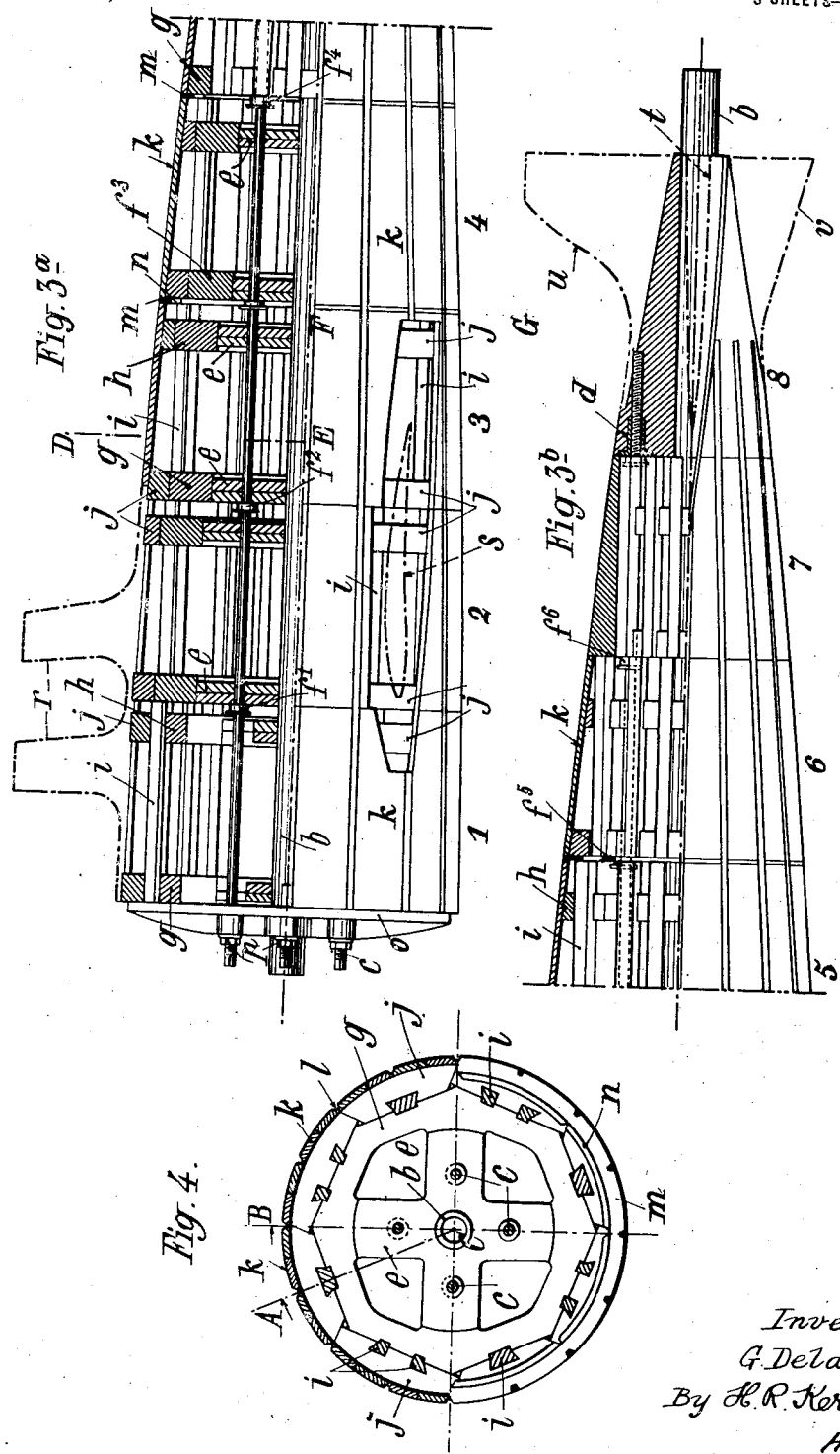

UNITED STATES PATENT OFFICE.

GUSTAVE DELAGE, OF ISSY-LES-MOULINEAUX, FRANCE, ASSIGNOR TO SOCIETE ANONYME DES ETABLISSEMENTS NEIUPORT, OF ISSY-LES-MOULINEAUX, FRANCE.

APPARATUS FOR CONSTRUCTING SECTIONAL MOLDS.

1,361,835.  Specification of Letters Patent.  Patented Dec. 14, 1920.

Application filed June 11, 1918. Serial No. 239,433.

*To all whom it may concern:*

Be it known that I, GUSTAVE DELAGE, a citizen of the French Republic, and resident of Issy-les-Moulineaux, France, have invented certain new and useful Improvements in Apparatus for Constructing Sectional Molds, of which the following is a specification.

This invention has for its object to provide an improved process for the construction of sectional molds, the characteristic feature of which is that the mold is composed of a plurality of sections held in place by internal mandrels which it is sufficient to merely dismount after the molding operation, in order to remove the sections of the mold without any difficulty.

The improved process is more particularly designed for the manufacture of the hulls or fuselages for aeroplanes in one piece which are constructed for instance of sheets or plates of metal or sheets or plates of plied wood, but this process is also applicable to the construction of all kinds of hulls or hollow bodies of curved profile where it is not possible to remove in one piece the mold that has served for making them.

A practical construction of a mold made according to the improved process, suitable for the manufacture of an aeroplane hull, is illustrated by way of example in the accompanying drawings in which:

Figure 1ª is a perspective detail of the mold with the outer section detached therefrom.

Fig. 1ᵇ is a perspective detail of the mandrel of the outer section of the mold and the spider.

Fig. 2 is a perspective view of two pairs of sections with their staves, detached from the mold.

Fig. 3ª is a view of a portion of a mold showing the same partly in longitudinal section and partly in side elevation.

Fig. 3ᵇ is a fregmentary view of the remaining portion of the mold.

Fig. 4 is a half section on the line D—E of Fig. 3 as to its upper half, and a half section on the line F—G of the same Fig. 3 as to its lower half.

Fig. 5 illustrates the core for molding the union-piece for the lower wing or plane.

Fig. 6 is a perspective view of one of the upright cores.

In the practical construction shown, the mold for the hull of an aeroplane is composed of a series of mandrels $a$ (Fig. 1) mounted on a central shaft $b$, four rods $c$ extending through arms $e$, being screwed in the last mold section 8 which is previously provided with screw-threaded sleeves $d$. These rods $c$ carry abutment rings $f^1, f^2, f^3, f^4 \ldots$ fixed in an adjustable manner at determined distances of the sections. Each mandrel is composed of two polygonal rings $g$ and $h$ which are connected by a series of longitudinal bars $i$ or dovetail slides, upon which are assembled at the time of mounting the mold, segments $j$ that constitute a sort of circular rim around each ring $g$ or $h$.

The slides $i$ project beyond the ring $h$ of each section for distances that increase progressively from the first section to the last section.

The segments $j$ are united in pairs (Fig. 2) by means of staves $k$ having rabbets that form on the mold, lodgments for receiving the longitudinals $l$ that serve as an internal reinforcement for the hull to which they are attached by screwing or nailing at the time of manufacture of the latter.

These longitudinals are stayed together by means of hoops $m$ which are previously inserted between the mold sections and are centered by means of tongues $n$ of which there is one to each segment $j$.

At the time of mounting the mold, the mandrels which have been previously provided with their pairs of segments and their staves, are slipped successively on to the central shaft $b$, while affording a passage to the rods $c$ upon which the abutment rings $f$ are mounted after each section has been placed in position. The hoops $m$ are then placed in position and the mold is tightened up by means of the spider $o$ which bears on the one hand against the segments $j$ of the first section, and receives on the other hand a pressure by means of nuts $p$ screwed upon the ends of the rods $c$.

In the application of the improved apparatus for molding the hull of an aeroplane, the improved process allows of molding the projecting parts, such as the uprights of the upper wing or plane, the unions for the lower wings and auxiliary surfaces, with the actual hull, in such a manner that these parts will form an integral portion thereof instead of being separate parts affixed to it as has hitherto been the usual method.

This method of construction allows of producing a machine having the greatest possible lightness and strength. With this object, some of the staves $k$ have been removed and replaced by affixed blocks, such as those shown in Figs. 5 and 6 which constitute the cores $r$ for the uprights of the upper planes and the cores $s$ for the unions for the lower planes.

In this particular case the parts $q$ of the uprights become longitudinals which are not divided and which form one piece with the hull after removal from the mold.

These affixed cores are held in position on the mold by means of screws whereby they are fixed on the segments $j$ with which they come in contact. These screws are then removed gradually as they are reached, in the construction of the hull, so as to allow of removing the cores without removing the pattern from the mold.

This improved sectional mold which can be removed from the inside allows for instance of making an aeroplane hull by means of walls composed of wooden planks plied together, the various parts of which are assembled and fixed as they are placed in position upon the longitudinals $l$ which have been previously placed in the mold and which serve as their internal reinforcement.

The removal of the pattern from the mold is effected by unscrewing the rods $c$. During this unscrewing the stop ring $f^1$ situated behind section No. 1, comes in contact with the arms $e$ of the ring $h$ of the first mandrel which thus slides between the slides $i$, becoming detached from each of the segments $j$ that surround it as shown in Fig. 5. When the mandrel has been completely detached and removed, there is removed from the interior of the hull one of the pairs of segments $j$ whose extreme faces jointing those of the adjacent segments are parallel, so that this pair of segments can be detached from the others by pulling it at right angles to the longitudinal axis of the central tube $b$. The other segments will then fall down of themselves or can be detached and removed without any difficulty.

On continuing to unscrew the rods $c$, the stop $f^2$ is brought into contact with the mandrel $a$, and pushing the latter in front of it it will detach it by releasing the corresponding segments $j$. The section 2 can thus be removed in the same way as the preceding section 1, and so on.

The successive removal of the mandrels from the mold is caused by the simple fact that the stops $f$ are situated at increasing distances from the rings $h$ of the various mandrels, so that each stop comes into contact with the corresponding mandrel only when the preceding section has been removed.

The mold core $r$ corresponding to the uprights of the upper planes, drops and can be readily removed after the dismounting and removal of the sections 1 and 2. The mold core $s$ corresponding to the unions of the lower planes is likewise removed from the inside after the removal of the sections 1, 2 and 3.

The last section 8 carries the cores of the auxiliary surfaces $t$, of the vertical rudder $u$ and of the bracket $v$ which are removed from the mold in the opposite direction to the section 8 by the usual means. The above described arrangements are given solely by way of example. The shapes, dimensions, constructional details and applications may vary without departing from the essential nature of the invention.

Having now particularly described and ascertained the nature of my said invention and in what manner the same is to be performed, I declare that what I claim is:—

1. An apparatus of the character described including a plurality of sections, a shaft arranged through the sections, rods extending through the sections and retaining means embracing the outer surfaces of the sections.

2. An interior molding apparatus of the character described including a plurality of sections, a shaft arranged through the sections, rods also extending longitudinally through the sections having their inner ends threaded and anchored in the innermost section, abutments carried by the rods at uniformly spaced intervals, clamping means engaging the outer ends of the rods for holding sections in proper relationship and coactive retaining means embracing the outer surfaces of the sections.

3. An interior molding apparatus comprising a plurality of sections each of which consists of a mandrel composed of spaced rings connected together and provided with radiating arms, a shaft on which the sections are mounted, rods arranged through the arms of the mandrels and having their inner portions screw threaded, screw threaded sleeves in the innermost end section for receiving the correspondingly threaded ends of the rods, abutment rings on the rods for coacting with the mandrel, clamping means adjustably engageable with the outer ends of the rods, a sectional covering surrounding the sections and retaining means embracing the covering.

4. An interior mold of the character described comprising, a plurality of sections each of which, except one, consists of a mandrel composed of a pair of rings provided with radial arms, dovetail longitudinal bars connecting the rings, a sectional rim surrounding each mandrel and comprising of a plurality of segments designed to be interlocked with the dovetail bars, screw threaded rods mounted in the mold sections, a shaft for supporting the sections, a plurality of rods arranged longitudinally through the several mold sections and having their inner ends screw threaded and engaged in the sleeves, a spider for embracing the outer ends of the shaft and the rods, and clamping means engaged on the outer ends of the rods.

5. An interior molding apparatus comprising a plurality of sections each of which consists of a mandrel composed of spaced rings connected together and provided with radiating arms, a shaft on which the sections are mounted, rods arranged through the arms of the mandrel and having their inner portions screw threaded, screw threaded sleeves in the innermost end section for receiving the correspondingly threaded ends of the rods, abutment rings on the rods for coacting with the mandrel, retaining longitudinals arranged against the sectional covering and hoops coacting with the longitudinals and maintaining the rod sections in proper relationship.

6. An interior molding apparatus including a plurality of sections, means for releasably clamping the sections in longitudinal relationship, a sectional covering arranged about the mold sections and provided at points with recesses, cores fitted in the recesses and retaining means embracing the covering and the cores.

Dated this 20th day of March, 1918.

GUSTAVE DELAGE.

Witnesses:
CHAS. P. PRESSLY,
VICTOR DUPONT.